3,155,330
CUTTING DEVICE FOR MANURE PUMPS

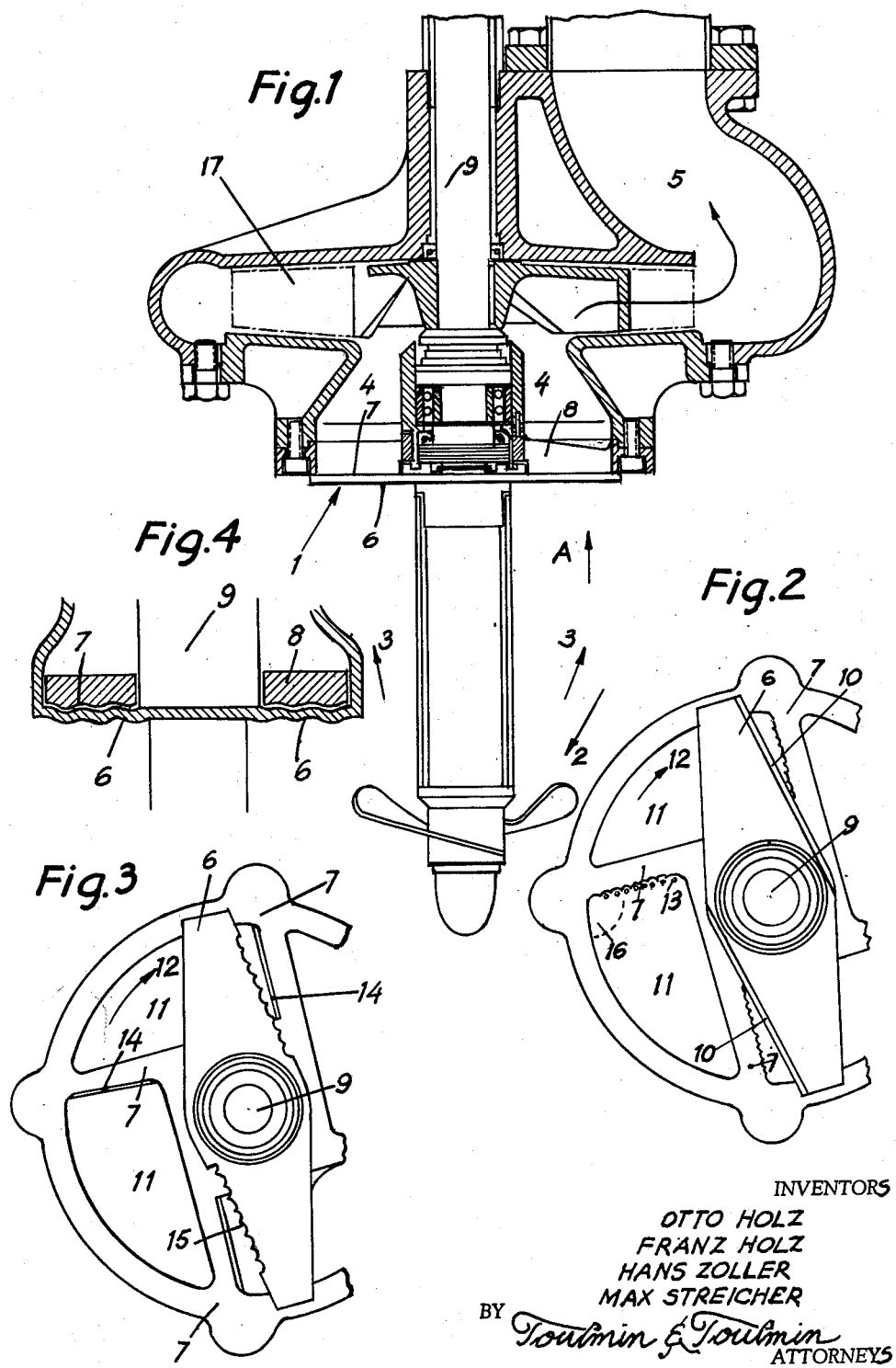

Otto Hölz, Peter-Dörler-Strasse 26; Franz Hölz, Pfanderweg 12; Hans Zoller, Silcherweg 6; and Max Streicher, Oderstrasse 28, all of Wangen, Allgau, Germany
Filed Feb. 11, 1963, Ser. No. 257,587
2 Claims. (Cl. 241—258)

The invention relates to a cutting device for use in front of the suction aperture of a manure pump which is provided with a stirrer and in which ribs forming stationary cutting blades are mounted in the suction aperture and co-operate with the cutting edge of a rotary cutting blade.

The invention aims to design both blades so that only a small force is required for cutting long fibrous material such as straw and the like and so that there is no danger of the suction aperture becoming clogged up. With known cutters, the long fibrous material in the manure is cut or sheared by the knife edge of the rotary blade gazing the edge of the stationary blades. In such constructions, the thick materials or the long fibrous material in the manure is always forced outwardly by the rotary blade so that the greatest resistance to the blade is at the edge of the suction aperture, i.e. at the outside, where most of the cutting takes place.

The disadvantage of such constructions is that the length of the cutting edge is not exploited uniformly, that there is a danger of clogging due to conglomeration at specific places along the cutting edge, and that the power required is very much greater than it would be if the material to be cut were evenly distributed along the cutting edge.

The object of the invention is to avoid these disadvantages and to adapt the cutting blades to the material to be cut, so that cutting takes place uniformly along the whole cutting edge.

According to the invention the cutting edges have projections and recesses in the plane of cutting.

According to a preferred feature, the cutting edges are provided with saw teeth. This means that the long fibrous material which passes through the suction aperture is retained all along the cutting edge by the projections and recesses provided therein, so that there is no longer any pressure towards the outer periphery of the suction aperture. There is thus much more uniform cutting and less power is used. Furthermore, there is less danger of conglomeration and clogging since suction aperture is uniformly loaded.

In one construction, the ribs forming the stationary blades divide the suction aperture into triangular passage apertures, the shortest side of the triangle forming the wavy cutting edge opposite the rotary blade which is tapered at its cutting edge.

The division of the suction aperture into triangular opening enables a hub or a bearing for the knife to be mounted in the centre. Moreover, the triangular cross-section results in uniform distribution of the material along the cutting edge, since the material to be cut by the rotary blade is held along the cutting edge.

In a further embodiment, the ribs have a flat, possibly hollow ground, cutting edge and the cutting edge of the knife is wavy.

This embodiment is a reversal of the preceding one, that is to say, the ribs are flat and the rotary blade is wavy, production costs being the criterion for choosing between the two constructions.

It is also possible for the cutting edge of the ribs to be formed by a hard cover welded thereon.

This construction helps to save materials, since only the cutting edges are covered with hard material.

According to a further embodiment, the rotary blade and the fixed blade are formed by interengaging wavy plates.

In such an embodiment the cutting edge is lengthened by its wavy shape. Moreover, there can be no clogging or hardening since the individual grooves are cleaned by the blade which fits into them. Manufacture is also made cheaper if suitable plates are used.

An example of the invention is illustrated in the drawing which, together with the related description, illustrates further features of the invention and in which:

FIG. 1 shows a cutting device on a manure pump provided with a stirrer;

FIG. 2 is a view of the cutting device seen in the direction of the arrow A in FIG. 1;

FIG. 3 illustrates a different construction of the cutting device; and

FIG. 4 shows a further construction of the cutting device.

In FIG. 1, a cutter 1 and a stirrer 2 are illustrated. The stirrer brings thick material and long fibrous material lying at the bottom of a manure pit to the cutter 1 in the direction of the arrow 3. The cutter 1 is mounted in the suction aperture of the centrifugal pump 17. From here the cut material is conveyed upwardly in the direction of the arrow 5 by centrifugal action. The cutter comprises one or more rotary cutting blades 6 and the ribs 8 form stationary cutting blades 7. The shaft 3 is used for driving the cutter 1, the stirrer 2 and the centrifugal pump 17.

In FIG. 2, like numerals denote like parts.

It will be seen that the rotary blade 6 has tapered cutting edges 10 and that triangular passage apertures 11 are provided to form the suction aperture. If the rotary blade is moved in the direction 12, then, due to the wavy design of the stationary blades 7, straw 13 will be held by the blades along their whole length as indicated diagrammatically by circles in the drawing. If the cutting edges 10 now pass over the stationary blade 7 cutting takes place along the whole cutting edge of the latter. The reverse construction is, of course, equally possible, as shown in FIG. 3, i.e. that the stationary blade 7 is hollow ground as indicated by the line 14 and the rotary cutting blade 6 has a wavy cutting edge 15. The wavy edge may, as shown, comprise rounded or part-circular recesses of which the axis extends parallel to that of the shaft 9 but the centre line may equally well be inclined at an angle to the axis of the shaft 9, according to the nature of the material to be cut.

FIG. 4 illustrates a further construction in which the rotary and stationary blades are formed by interengaging wavy plates.

The invention can be applied to all cutters where long fibrous material is passed through an aperture and where the cutting blade has a tendency to force the portions to be cut into a corner of the passage aperture (for example into the corner 16 as shown in the drawings).

We claim:

1. In combination, a manure pump having a casing and a rotary drive shaft extending therethrough, said casing having a suction opening positioned concentrically about said shaft adjacent the inlet side of the pump, a cutter blade mounted on said shaft at the inlet to the pump and rotatable by the shaft with said cutter blade having shearing edges in the direction of rotation of the blade, ribs rigidly mounted with respect to said casing adjacent to the cutter blade and extending across said opening in a plane at right angles to said shaft, said ribs defining elongated triangular openings arranged about said shaft in the direction of rotation thereof, the rib forming the short side of each of said elongated triangular openings facing the shearing edge of said rotatable blade and having a shearing edge cooperating with the shearing edge of the blade, and one of said shearing edges having alternately arranged projections and recesses throughout the extent of the edge and substantially in the plane thereof to effect cutting of the material passing to the pump along the entire cooperating shearing edges of the blade and rib and thereby eliminating a build-up of pressure toward the outer periphery of the suction opening.

2. A device according to claim 1, wherein a stirrer is mounted on said shaft outwardly of said cutter.

References Cited by the Examiner

UNITED STATES PATENTS

| | | | |
|---|---|---|---|
| 1,960,048 | 5/34 | Bruce | 103—88 |
| 2,460,757 | 2/49 | Kurz | 103—88 |
| 3,005,597 | 10/61 | Neidl | 103—111.1 |
| 3,042,244 | 7/62 | Hansel | 241—278 |

FOREIGN PATENTS

| | | |
|---|---|---|
| 100,337 | 12/98 | Germany. |
| 584,395 | 7/44 | Great Britain. |

J. SPENCER OVERHOLSER, *Primary Examiner.*

JOSEPH H. BRANSON, JR., *Examiner.*